Oct. 20, 1931.  L. D. KAY  1,828,500

TRUCK WHEEL

Filed July 16, 1928

INVENTOR.
Lloyd D. Kay
BY
Lyon & Lyon
Attorneys

Patented Oct. 20, 1931

1,828,500

UNITED STATES PATENT OFFICE

LLOYD D. KAY, OF LOS ANGELES, CALIFORNIA

TRUCK WHEEL

Application filed July 16, 1928. Serial No. 293,186.

This invention relates to automobile wheels and is particularly applicable in the construction of truck wheels. While the invention may be applied to any kind of an automobile for securing the tire upon it, in this specification I have described the invention as applied to a dual tire truck wheel.

The general object of the invention is to provide a simple construction for a wheel which will facilitate the mounting of the tire or tires upon it and which will insure that the tire will be properly centered on the wheel.

A further object of the invention is to provide a wheel of this kind which can be readily formed as a casting and which will provide simple means for carrying the tires so that the resiliency of the rims is utilized to absorb road shocks; also to provide a wheel on which standard rims can be readily mounted, either in an inboard or an outboard position.

A further object of the invention is to provide a construction for such a wheel as will simplify the machining operations and reduce the cost of production.

Further objects of the invention will appear hereinafter.

The invention consists in the novel parts and combination of parts to be described hereinafter all of which contribute to produce an efficient truck wheel.

A preferred embodiment of the invention is described in the following specification, while the broad scope of the invention is pointed out in the appended claims.

In the drawings:

Figure 1 is a side elevation of a truck wheel embodying my invention and showing a portion of the tire and other parts broken away.

Figure 2 is a cross-section taken on the line 2—2 of Figure 1, but upon an enlarged scale, a portion of the outboard rim being broken away.

Figure 3 is a cross-section on the line 3—3 of Figure 1 upon the same scale as Figure 2, and further illustrating details of the construction of the wheel.

In practicing the invention I provide a wheel body 1 which is preferably of cast iron or cast steel, including a hub 2 and, in the present instance, a plurality of radial spokes 3 which may be of hollow form.

This wheel is constructed in such a way that the wheel presents a relatively fixed seat for the tire rim, or rims, involving the use of three bearing points on the circumference of the wheel which are so placed that the tire may be applied over the wheel so as to come upon these seats. These seats are so positioned that they operate to center the tire rim on the wheel. After the tire rim has been centered on the wheel in this way other means provided on the wheel are operated to secure the tire at other points to the wheel, thereby holding the tire on the wheel in its centered position. While this effect can be attained by providing several relatively fixed seats on the wheel located on the same side of a diameter of the wheel, I prefer to employ a single relatively fixed seat and on each side of the same I provide movable seat members which can be moved outwardly on the wheel to a predetermined position to co-operate with the relatively fixed seat in centering the wheel. On the other side of the said diameter, or diametrical line, I provide means for completing the securing of the rim. In order to accomplish this I provide the edge of the wheel with a box form, or channel form, felloe 4 having a substantially cylindrical wall 5 which constitutes the web of the channel, or bottom of the "box." The sides 6 of the channel project outwardly as flanges of the web 5 and are disposed in a plane at right angles to the axis 7 of the wheel. The inner faces 8 of these flanges constitute guide faces for the movable seat members to be described hereinafter.

At any point on the circumference of the wheel I provide a deep throat or gap 9 (see Figure 1) at which point the channel form felloe is cut away and presents two substantially radial faces 10 to co-operate with the driving lugs or tongues 11 of the tire rims. (See Figure 3.) At this throat 9 the felloe 4 is formed with lateral extensions 12 and the outer face of each extension is formed into a tire rim seat 13. In the present instance this seat has a form adapting it to receive a standard tire rim such as the inboard tire rim 14 and the outboard tire rim 15. These tire rims are of standard construction, being formed of stout steel rings. They are mounted on the wheel in such a way that the inboard tire rim overhangs the inboard side of the wheel and the outboard tire rim overhangs the outboard side of the wheel. This overhang is considerable, and enables the resiliency of this rim to take up road shocks. The outboard edge of the inboard rim 14 is formed with outwardly projecting bead 16 that seats against an abrupt shoulder 17 formed at this side of the seat 13, and the seat presents an inclined seat face 18 that receives the inclined or conical portion 19 of the rim that connects the bead with the body of the rim.

A construction similar to this is adopted as indicated in Figure 3 on the outboard extension 12, enabling the outboard rim 15 to be mounted with its bead 20 disposed toward the inboard side of the wheel; in other words, standard rims of this type are provided with corresponding seats on the wheel placed in reversed relation.

At two points removed circumferentially on the wheel with respect to the throat 9 I provide two movable seat members 21. (See Figure 2.) Each of these seat members is preferably in the form of a block mounted to move radially outwardly on the wheel in a radial direction. For this purpose the block 21 is formed with finished side faces 22 that seat against the guide faces 8. Furthermore, at the location of each of these blocks a notch or recess 23 is formed in the felloe 4, in other words, the flanges 6 of the felloe 4 are formed with aligning notches to facilitate the radially inward and outward guiding movement of the blocks. Each block 21 is formed with a lateral extension 25 on its inboard side which constitutes an arm to extend out against the inner face of the tire rim 14 and on its outer side this extension 25 is formed into a seat 26 to fit the beaded edge of the tire rim. This seat, of course, aligns with the corresponding seat at the point 13 on the relatively fixed seat of the wheel. (See Figure 3.)

On the outboard side of the block 21 a lateral extension or arm 27 is provided similar to the extension 25, and also provided with a seat 28 on its upper side in alignment with the corresponding fixed seat (see Figure 3) on the outboard side of the wheel.

Suitable means are provided for moving the blocks 21 radially outwardly, and this means preferably includes means for limiting the outward movement of the block in a predetermined position, so that the seat face of the block will be at the same radius from the axis of the wheel as the seat face on the relatively fixed seat of the wheel. In order to accomplish this I provide each block with an adjusting stud or bolt 29 the inner end of which is threaded and screwed tight into the inner side of the block with respect to the axis of the wheel. These studs are threaded as shown and the outer portion of each stud carries a collar 30 which is rotatably mounted in an opening 31 in the web 5 of the channel. The diameter of this collar outside of the opening 31 is larger than the opening so as to take thrust from the stud developed by the block 21, and the outer portion of the collar has a neck 32 of reduced diameter that extends inwardly beyond the web 5 and carries rigidly a nut head 33 enabling the collar to be rotated at will by means of a wrench. By rotating this collar in this way in the proper direction, it will be evident that the block 21 can be adjusted radially outwardly.

Any suitable means is provided for limiting the radial outward movement of the block so as to bring about the above described circumferential alignment of the seats on the block with the relatively fixed seats on the wheel. For this purpose the inner end of the stud 29 is provided with a head 34 of slightly larger diameter than the stud. The outer faces of these heads 34 with respect to the axis of the wheel are machined so that when the nut 33 is rotated, the head 34 will stop the outward movement of the block at the proper predetermined point.

In order to prevent the blocks from falling out of the wheel, the reduced neck 32 of each collar is provided with an annular groove near the nut 33 which receives a split spring ring 35. (See Figure 2.)

These two blocks 21 are located in a spaced relation from the throat 9, that is to say, they are disposed on opposite sides of the radial line passing through the relatively fixed seat, and they are also located on the same side of the diametrical line 36 passing through the axis of the wheel and at right angles to the radial line referred to. When the two blocks 21 have been moved out radially as far as will be permitted by the heads 34, the tire rims may be set on the relatively fixed seats and on the seats of the movable blocks 21. This will center the tire rim on the wheel.

In order to secure the tire rims on the wheel I provide two other seat blocks 37 that are similar to the blocks 21. These blocks 37 are mounted each in a notch 38 in the outer edge of the channel or felloe 4 and are similarly provided with an adjusting bolt 39. However, the outer ends of these adjusting bolts 39 are not provided with any means such as the heads 34 on the bolts 29 for limiting the radially outward movement; in other words, they can be moved out by rotating their nuts 40 respectively until they are firmly seated against the inner side of the tire rim.

The wheel is most conveniently constructed with five spokes and the movable clamping members are preferably located on radial lines in the angle between the adjacent spokes, with the nuts 33 and 40 of the bolts located between the channel or "box" 4 and the hub 2.

A wheel embodying the features of construction described above may be very readily cast and machined. It will be noted that the channel or felloe 4 extends continuously around the wheel and is open all around the wheel, hence the side faces 8 of the flanges 6 and, if desired, the outer faces of the web 5, may be turned on a lathe. While these faces are being machined, the boring of the hub 2 may be effected. The relatively fixed seats at 12 and 13 on the wheel can be machined at the same time.

In order to make the blocks 21 and 37 I prefer to make a continuous ring having the shape in cross-section of the blocks as indicated in Figure 2. This ring is then sawed up with a hacksaw disposed in a radial plane to produce the blocks. This enables the blocks to be machined while they are in the form of a ring.

It will be noted that the seats for the inboard tire rim have an inclined face that extends away from the axis of the wheel toward the inboard side, while the seats for the outboard tire incline in the opposite direction. This enables standard tires to be used for the inboard and outboard sides of the wheel by simply applying the tire rims in the manner indicated in Figure 2.

It is understood that the embodiment of the invention described herein is only one of the many embodiments this invention may take, and I do not wish to be limited in the practice of the invention, nor in the claims, to the particular embodiment set forth.

I claim:

1. In a truck wheel, the combination of a wheel body having a rim with a relatively fixed seat for the tire-rim, formed rigid with the wheel body, a pair of seat members disposed one on each side of the relatively fixed seat adjacent the rim of the wheel and mounted on the wheel for outward radial movement on the wheel and having means for limiting the said outward movement to hold the said seat members at a predetermined point in their outward movement so that the said movable seat members will co-operate with the relatively fixed seat to center the tire-rim when applied to the wheel, and means on the edge of the wheel opposite the relatively fixed seat mounted to move outwardly and engage the tire-rim to secure the same in its centered position.

2. In a truck wheel, the combination of a wheel body having a relatively fixed seat rigid with the wheel body, a pair of seat blocks disposed one on each side of the relatively fixed seat at the edge of the wheel, said wheel having means for guiding said seat-blocks to enable the same to be adjusted in a general radial direction on the wheel, means for adjusting said seat-blocks in a radially outward direction with means for limiting the outward movement of the seat-blocks at a predetermined point so that the seat-blocks can co-operate with the relatively fixed seat to center the tire-rim on the wheel, and means on the edge of the wheel opposite the relatively fixed seat mounted to move radially outward to clamp the rim after the same has been centered.

3. In a truck wheel, the combination of a wheel body having a relatively fixed seat on its edge formed rigid with the wheel body, a pair of seat blocks disposed one on each side of the relatively fixed seat at the edge of the wheel, an adjusting bolt corresponding to each seat-block disposed in a substantially radial direction for adjusting the seat-block outwardly on the wheel, means for stopping the outward movement of the movable seat-blocks at a predetermined point enabling the movable seat-blocks to co-operate with the relatively fixed seat to center a tire-rim on the wheel, and clamping means mounted on the wheel opposite the fixed seat for securing the same to the wheel after it has been centered.

4. In a truck wheel, the combination of a wheel body having a relatively fixed seat rigid with the wheel body, a pair of movable seat-blocks disposed one on each side of a radial plane passing through the said fixed seat and mounted on the wheel for radial outward movement, each of said movable seat-blocks having means for limiting its outward movement to stop the same in a predetermined position and enable the movable seat-blocks to co-operate with the fixed seat to center a tire-rim, and means on the wheel body at another point for engaging and securing the tire-rim after the same has been centered.

Signed at Los Angeles, California, this 6th day of July, 1928.

LLOYD D. KAY.